US009832032B2

(12) United States Patent
Jeong et al.

(10) Patent No.: US 9,832,032 B2
(45) Date of Patent: Nov. 28, 2017

(54) METHOD FOR CELL RESELECTION FOR RECEPTION OF PACKET DATA

(75) Inventors: Kyeong-In Jeong, Suwon-si (KR); Soeng-Hun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 3387 days.

(21) Appl. No.: 10/914,451

(22) Filed: Aug. 9, 2004

(65) Prior Publication Data

US 2005/0041608 A1    Feb. 24, 2005

(30) Foreign Application Priority Data

Aug. 7, 2003   (KR) ................................ 2003-54672

(51) Int. Cl.
| | |
|---|---|
| *H04B 7/00* | (2006.01) |
| *H04L 12/18* | (2006.01) |
| *H04W 72/00* | (2009.01) |
| *H04W 36/08* | (2009.01) |
| *H04W 36/22* | (2009.01) |
| *H04W 36/38* | (2009.01) |

(52) U.S. Cl.
CPC ......... *H04L 12/189* (2013.01); *H04W 72/005* (2013.01); *H04W 36/08* (2013.01); *H04W 36/22* (2013.01); *H04W 36/38* (2013.01)

(58) Field of Classification Search
CPC .... H04L 12/189; H04W 36/08; H04W 36/22; H04W 36/38; H04W 72/005
USPC ....... 370/310, 328, 322, 473, 331, 332, 329, 370/327, 389, 312, 437; 455/406, 525, 455/436, 450, 435.1, 435.2, 411, 437, 455/451, 452.2, 62, 421, 513, 435, 555; 709/238, 217, 231
See application file for complete search history.

(56) References Cited

U.S. PATENT DOCUMENTS

| | | | |
|---|---|---|---|
| 6,393,003 B1 | 5/2002 | Lee | |
| 6,434,380 B1 * | 8/2002 | Andersson et al. | .......... 455/406 |
| 6,546,251 B1 | 4/2003 | Dalsgaard et al. | |

(Continued)

FOREIGN PATENT DOCUMENTS

| | | |
|---|---|---|
| EP | 0941006 | 9/1999 |
| EP | 1309213 | 5/2003 |

(Continued)

OTHER PUBLICATIONS

Vodafone Group: "Requirement for Management of UEs on Co-Located Cells", 3GPP TSG-RAN2/3 Joint MBMS Meeting # 1, R2-030064, Jan. 13, 2003.

(Continued)

*Primary Examiner* — Tan H Trinh (74) *Attorney, Agent, or Firm* — The Farrell Law Firm, P.C.

(57) ABSTRACT

A method for enabling a user terminal to receive packet data in a mobile communication system supporting a packet data service. In the method, a radio network controller receives a session start message from a core network, determines whether or not a frequency area (FA) including the user equipment supports the MBMS service, and transmits a notification message, which contains cell reselection information used when the user equipment moves into an FA supporting the MBMS service, to the user equipment when the user equipment is located in an FA, which does not support the MBMS service.

18 Claims, 7 Drawing Sheets

(56) References Cited

U.S. PATENT DOCUMENTS

| | | | |
|---|---|---|---|
| 6,625,132 B1* | 9/2003 | Boettger | H04B 7/2628 370/329 |
| 6,728,203 B2* | 4/2004 | Wang | 370/210 |
| 6,792,284 B1* | 9/2004 | Dalsgaard | H04W 36/0094 370/331 |
| 6,909,702 B2* | 6/2005 | Leung | H04L 29/06 370/252 |
| 8,995,991 B2* | 3/2015 | Terry | H04W 48/08 455/422.1 |
| 2002/0045447 A1 | 4/2002 | Rasanen | |
| 2002/0111166 A1* | 8/2002 | Monroe | H04W 48/20 455/435.3 |
| 2003/0026240 A1 | 2/2003 | Eyuboglu et al. | |
| 2003/0088695 A1* | 5/2003 | Kwak | H04W 68/00 709/238 |
| 2003/0157937 A1 | 8/2003 | Oikarinen et al. | |
| 2004/0042452 A1* | 3/2004 | Cayla | H04L 1/188 370/389 |
| 2004/0103435 A1* | 5/2004 | Yi | H04W 72/005 725/81 |
| 2004/0190469 A1* | 9/2004 | Pekonen | H04W 48/08 370/328 |
| 2005/0083884 A1* | 4/2005 | Lee | H04W 72/005 370/331 |
| 2005/0090278 A1* | 4/2005 | Jeong | H04W 36/0055 455/525 |
| 2005/0096063 A1* | 5/2005 | Muniere | H04W 8/20 455/452.2 |
| 2005/0213541 A1* | 9/2005 | Jung | H04W 4/06 370/331 |
| 2005/0249140 A1* | 11/2005 | Lee | H04B 7/2603 370/312 |
| 2006/0029066 A1* | 2/2006 | Jeong | H04L 12/189 370/389 |
| 2008/0305790 A1* | 12/2008 | Wakabayashi | H04B 7/022 455/434 |

FOREIGN PATENT DOCUMENTS

| | | |
|---|---|---|
| EP | 1 318 690 | 6/2003 |
| JP | 6-508735 | 9/1994 |
| JP | 11-136729 | 5/1999 |
| JP | 11-275628 | 10/1999 |
| JP | 2000-175263 | 6/2000 |
| JP | 2001-308856 | 11/2001 |
| JP | 2002-525938 | 8/2002 |
| JP | 2002-535941 | 10/2002 |
| KR | 1020020058007 | 7/2002 |
| WO | WO 93/05622 | 3/1993 |
| WO | WO 00/16581 | 3/2000 |
| WO | WO 00/44189 | 7/2000 |
| WO | WO 03/015439 | 2/2003 |
| WO | WO 03/039185 | 5/2003 |

OTHER PUBLICATIONS

3rd Generation Partnership Project; Technical Specification Group Radio Access Network; Introduction of the Multimedia Broadcast Multicast Service (MBMS) in the Radio Access Network (Stage-2); (Release 6), 3GPP TS 25.346, Jun. 1, 2003.

* cited by examiner

METHOD FOR CELL RESELECTION FOR RECEPTION OF PACKET DATA

PRIORITY

This application claims priority to an application entitled "Method for Cell Reselection for Reception of Packet Data" filed in the Korean Intellectual Property Office on Aug. 7, 2003 and assigned Ser. No. 2003-54672, the contents of which are hereby incorporated by reference.

BACKGROUND OF THE INVENTION

1. Field of the Invention

The present invention relates generally to a packet data service, and more particularly to a method by which a user equipment located in a geographical area including a plurality of overlapping cells having different frequency bands can receive packet data of a packet data service provided to at least one cell selected from the plurality of cells in the geographical area.

2. Description of the Related Art

Figure 1:
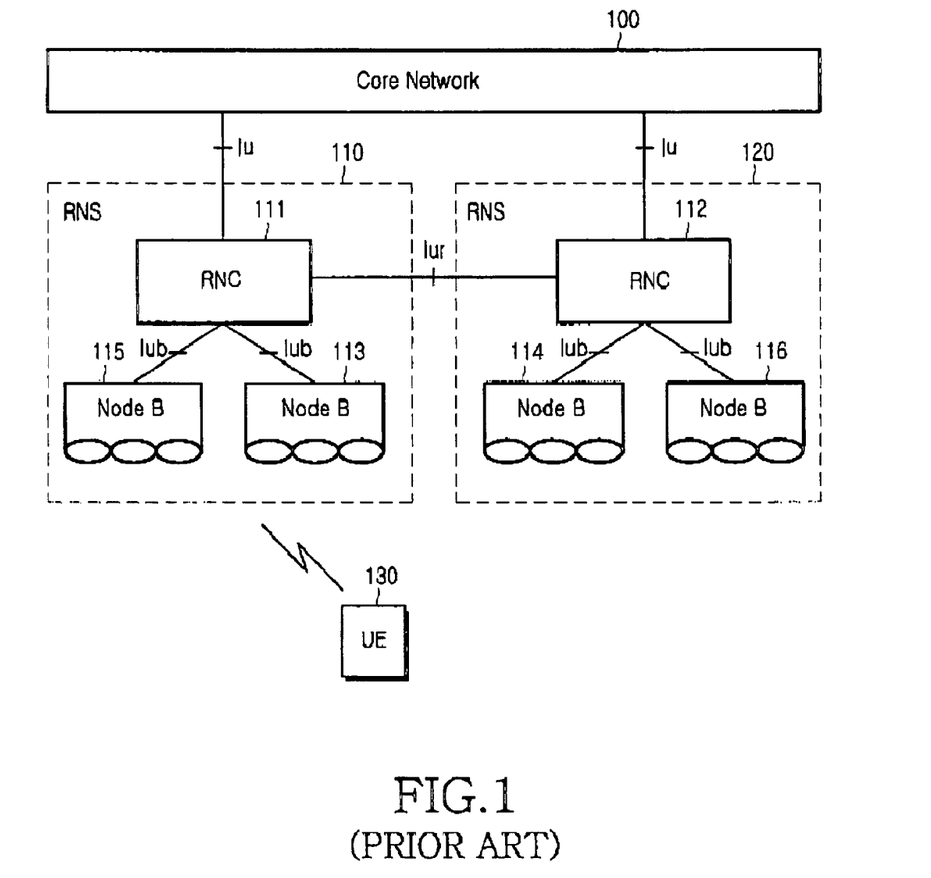
FIG. 1 is a block diagram schematically illustrating a conventional mobile communication system.

FIG. 1 is a block diagram schematically illustrating a conventional mobile communication system. In FIG. 1, the mobile communication system is a universal mobile terrestrial system (UMTS) mobile communication system that includes a core network (CN) 100, multiple radio network subsystems (RNSs) 110 and 120, and a user element (UE) 130. Each of the RNSs 110 and 120 includes a radio network controller (RNC) and multiple base stations (or node Bs). For example, the RNS 110 includes a RNC 111, and node Bs 113 and 115, and the RNS 120 includes a RNC 112, and node Bs 114 and 116.

Further, each of the RNCs 111 and 112 may be classified as a serving RNC (SRNC), a drift RNC (DRNC), or a controlling RNC (CRNC) according to an operation of each RNC. The SRNC is an RNC for managing information of each UE and controlling data transmission with the CN 100. Further, when data of a UE is transmitted/received to/from a SRNC via another RNC other than the SRNC, the DRNC becomes the another RNC.

The CRNC is an RNC for controlling each node B. When the RNC 111 manages the information of the UE 130 as illustrated in FIG. 1, the RNC 111 operates as a SRNC with respect to the UE 130. Further, when the UE 130 moves and the data of the UE 130 is transceived through the RNC 112, the RNC 112 becomes a DRNC with respect to the UE 130, and the RNC 111 controlling the node B 113 communicating with the UE 130 becomes a CRNC of the node B 113.

The RNC and the node B are connected to each other through a lub interface. The RNCs are connected to each other through a lur interface. The UE and a UTRAN are connected to each other through a Uu interface.

The RNC assigns a radio resource to multiple node Bs controlled by the RNC and the node B provides the UE with the radio resource assigned by the RNC. The radio resource is provided according to each cell, and the radio resource provided by the node B represents a radio resource regarding a specific cell controlled by the node B.

The UE sets a radio channel by means of the radio resource regarding the specific cell controlled by the node B, and transmits/receives data by means of the set radio channel. Accordingly, because the UE recognizes only a physical channel provided according to each cell, a distinction between a node B and a cell has no meaning. Hereinafter, the present invention uses the terms a node B and a cell interchangeably.

In order to support multicasting multimedia communication, a broadcast/multicast service provides a service from one data source to a plurality of user equipments (UEs). The broadcast/multicast service may be classified as a cell broadcast service (CBS), a message-centered service, and a multimedia broadcast/multicast service (MBMS) supporting a multimedia such as a real-time image and voice, a still image, characters, etc.

Figure 2:
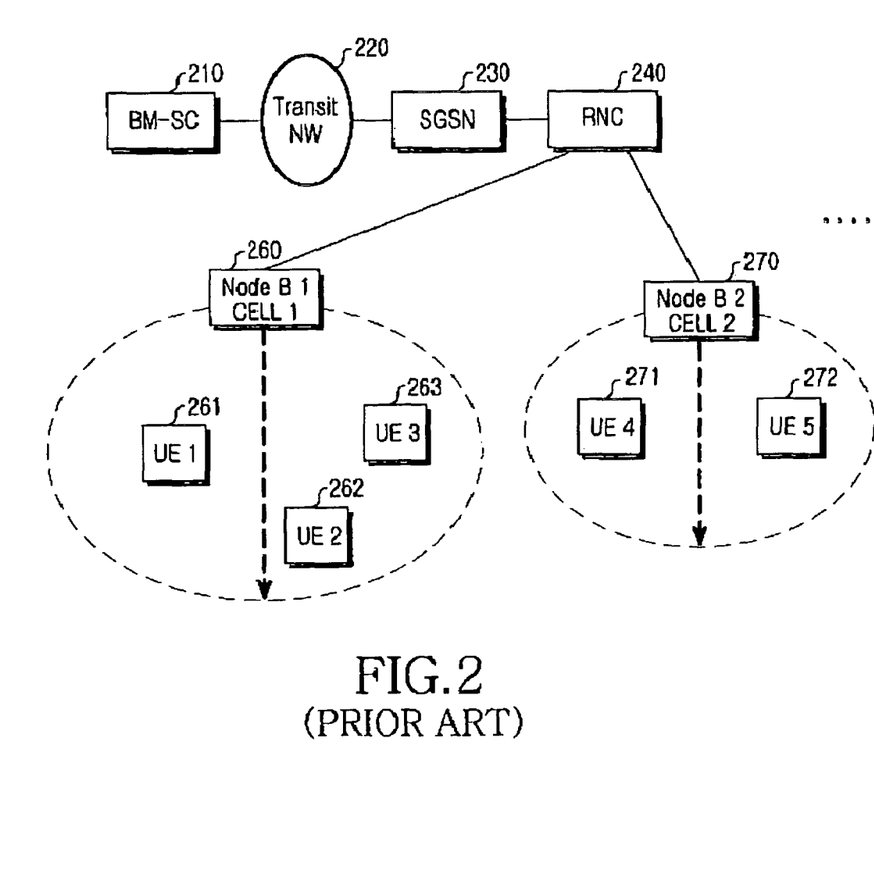
FIG. 2 is a block diagram illustrating a structure of an MBMS system.

FIG. 2 is a block diagram schematically illustrating a network for providing the MBMS service in the mobile communication system. Referring to FIG. 2, a broadcast/multicast-service center (BM-SC) 210 provides an MBMS stream, and schedules a stream for the MBMS service to transmit the stream to a transit network 220. The transit network 220 is a network located between the BM-SC 210 and a serving GPRS support node (SGSN) 230 and sends the stream for the MBMS service, which is received from the BM-SC 210, to the SGSN 230. Herein, it is assumed that the SGSN 230 may include a gateway GPRS support node (GGSN) and an external network, etc., and that there are multiple UEs intending to receive the MBMS service at a predetermined time point, e.g., a UE 261, a UE 262, and a UE 263, each belonging to a first cell (node B1) 260, and a UE 271 and a UE 272, each belonging to a second cell (node B2) 270.

The SGSN 230 having received the stream for the MBMS service from the transit network 220 controls an MBMS related service of UEs intended for reception of a MBMS service. For example, the SGSN 230 manages MBMS service accounting related data of each UE and selectively transmits MBMS service data to a specific RNC 240. Further, the SGSN 230 creates and manages an SGSN service context for the MBMS service X, and transmits the stream for the MBMS service to the RNC 240 again.

The RNC 240 controls a plurality of node Bs and transmits the MBMS service data to a node B, which includes a UE requesting the MBMS service, from among the node Bs controlled by the RNC 240, controls a radio channel set for providing the MBMS service, and creates and manages a RNC service context for the MBMS service X with the stream for the MBMS service received from the SGSN 230. Further, as illustrated in FIG. 2, only one radio channel is assigned to one node B, e.g., a Node B 260 and UEs 261 to 263, in order to provide the MBMS service. Further, a home location register (HLR) is connected to the SGSN 230 to perform an subscriber authentication for the MBMS service.

Figure 3:
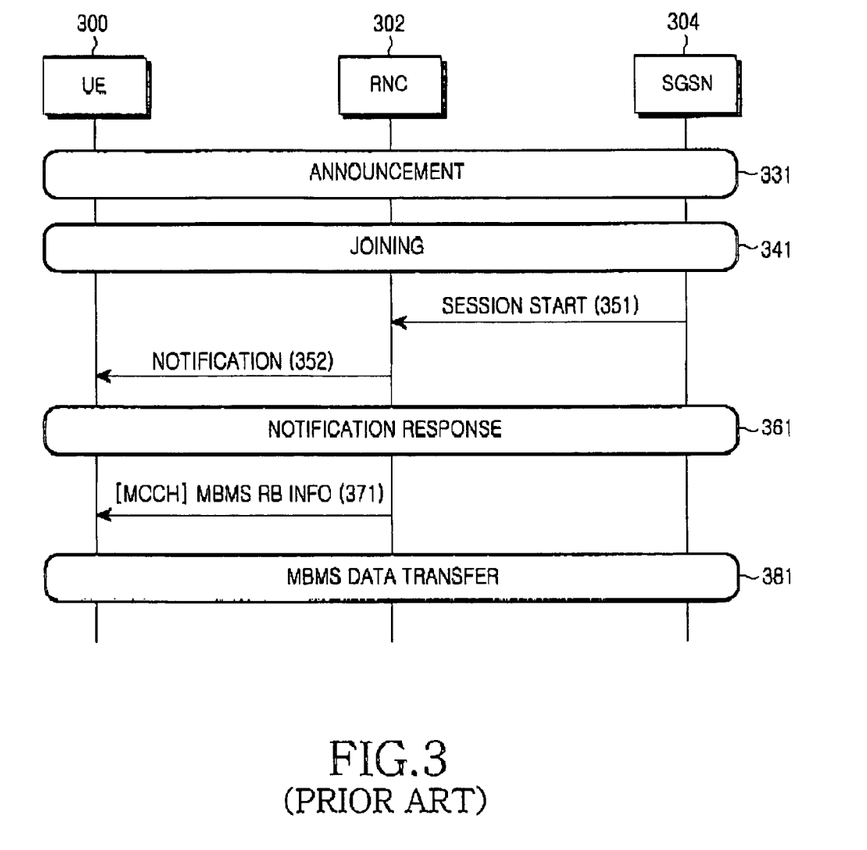
FIG. 3 is a view illustrating an operation between each node in a mobile communication system supporting an MBMS service.

FIG. 3 is a view illustrating a process through which the MBMS service is provided between a RNC and a UE requesting the MBMS service. The RNC provides the MBMS service to corresponding UEs requesting the MBMS service via a node B. Herein, it is clear that the MBMS service is performed via a node B. Further, a MBMS control message transmitted for the MBMS service will also be described.

Referring to FIG. 3, a UE 300 is a UE intended for reception of the corresponding MBMS service and an RNC 302 is RNC transmitting the MBMS service. Four steps are sequentially performed in a sequence of an announcement step, a joining step, a notification step, and a radio bearer (RB) setup step. Hereinafter, the four steps will be described with reference to FIG. 3.

In step 331, i.e., the announcement step, an SGSN 304 informs the UE 300 of a start time of the MBMS service. Herein, the information contains the kinds of MBMS services, time information on a start of the MBMS services, and duration of the MBMS services.

In step 341, the UE 300 requesting the MBMS services performs the joining step for the SGSN 304 according to the MBMS service notification by the SGSN 304. In the joining step, the UE 300 transmits a joining request message requesting a joining to the SGSN 304. The joining request message includes the identification code of a specific MBMS service, which is requested by the UE 300, and the identifier (UE ID) of the UE 300 requesting the MBMS service from among a MBMS service list transmitted from the SGSN 304.

Further, in step 341, the SGSN 304 performs an authentication process for the UE 300 requesting the MBMS service, and notifies the UE 300 of information regarding whether or not the UE 300 can receive the MBMS service from the result of the authentication. The SGSN 304 stores a list of UEs intended for reception of the specific MBMS service and the positions of the UEs by performing step 341.

In the mobile communication system, when the joining step for the MBMS service has been completed, the notification step, which is illustrated in steps 351, 352, and 361, is performed. More specifically, when a BM-SC reports the start of the MBMS service, the SGSN 304 transmits a session start message to the RNC 302 including the UE 300 having performed the joining process, in step 351. In step 352, the RNC 302 transmits a notification message for paging the UE 300, which is to receive the MBMS service, by means of a common channel, such as a secondary-common control channel (S-CCPCH). The notification is a process through which the SGSN informs the corresponding UE 300 requesting the MBMS service of the start of the MBMS service. Because a plurality of UEs are paged through the transmission of the notification message, step 352 is called a group paging step for the distinction with the existing paging procedure. For example, the notification message can be transmitted through a MBMS control channel (MCCH).

In step 361, the UE 300 paged in step 352 transmits a response message for the notification message. Through the transmission of the response message, the RNC 302 can check the number of UEs intended for reception of the MBMS service according to cells, and determine the kind of radio channels of a corresponding cell. The RNC 302 does not count all UEs intended for reception of the MBMS service. Instead, the RNC 302 counts the UEs only until the number of the UEs can satisfy a threshold for channel type decision. When a plurality of UEs contained in a specific cell intend to receive a MBMS service, the RNC 302 provides the MBMS service through a common channel. However, when a cell contains a small number of UEs intended for reception of the MBMS service, the RNC 302 can assign a dedicated channel according to each UE and provide the MBMS service.

In step 371, the UE 300 requesting the MBMS service and performing the step relating to the notification performs the radio bearer setup step by means of radio bearer information transmitted by the RNC 302 through an MCCH. The radio bearer setup step is a step in which a radio resource is actually assigned in order to provide the MBMS service and in which information on the radio resource is announced to relating devices. Further, in the radio bearer setup step, MBMS radio bearer information enabling the MBMS service to be received without an error is transmitted. That is, the UE 300 can restore the transmitted MBMS service without an error by using the MBMS radio bearer information. The MBMS radio bearer information may include radio channel information such as OVSF code information, transmission format information, radio link control (RLC) information, packet data convergence protocol (PDCP) information, etc. A detailed description about the information is disclosed in a 3GPP TS 26.331.

When the radio bearer setup step has been completed, all UEs intended for reception of a specific MBMS service recognize information on a radio link through which the MBMS service is provided and information on an upper layer in which the MBMS service is processed.

In step 381, when the RNC 302 transmits MBMS data transmitted from the SGSN 304 through a set MBMS RB, the UE 300 receives the MBMS data provided through the MBMS RB.

As indicated above, the MCCH is a channel through which control information on the MBMS is provided. Specific characteristics of this channel are currently being discussed and have not been standardized yet. According to recent discussions, an MCCH is expected to have the following characteristics:
1. one MCCH is constructed per cell;
2. an MCCH is transmitted thorough a common physical channel such as an S-CCPCH; and
3. UEs can obtain information on an MCCH assigned according to each cell as system information.

Figure 4:
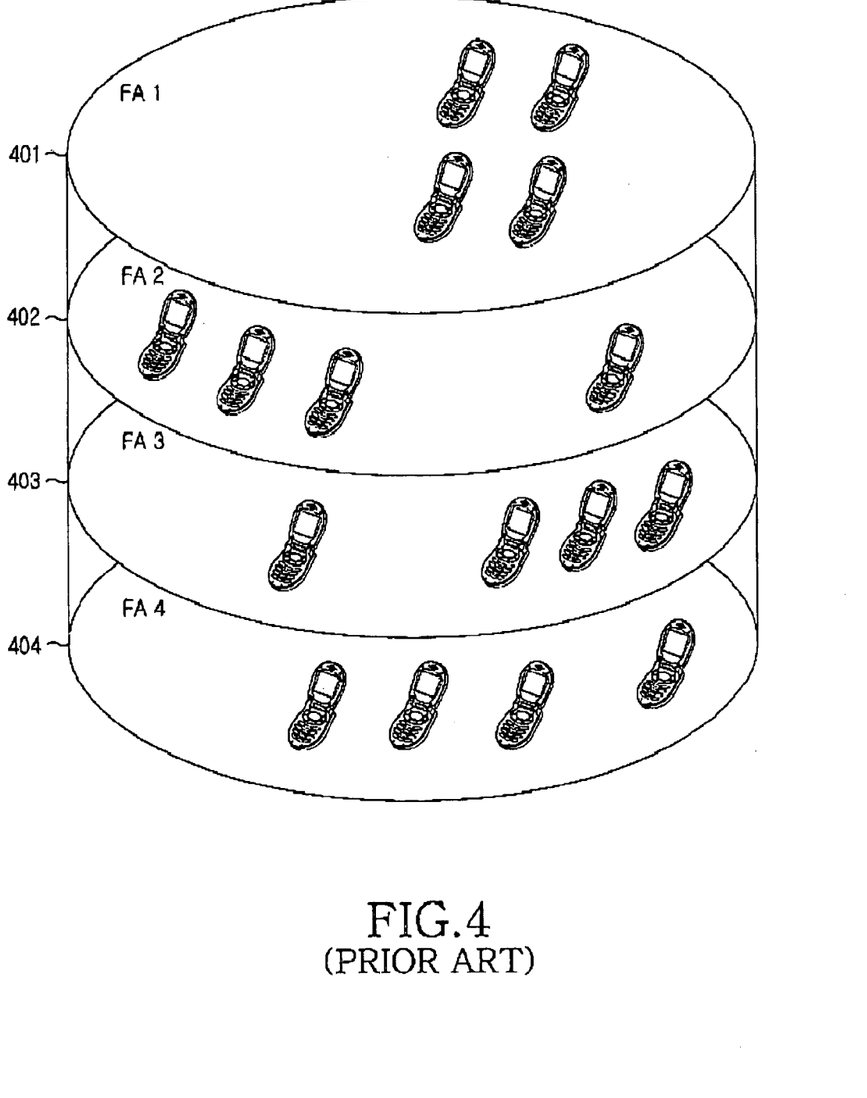
FIG. 4 is a view illustrating a structure in which a plurality of cells overlap in one area.

FIG. 4 illustrates a structure in which a plurality of frequency areas (FAs) overlap in one area. As illustrated in FIG. 4, one RNC includes at least one FA and a plurality of FAs can perform a MBMS service in the same area. That is, in servicing the same MBMS data in the same area, radio resources that are different from each other are used.

More specifically, FIG. 4 illustrates four FAs, that is, FAs 401 to 404. The four FAs service one MBMS data with respect to the same area. A UE contained in one of the four FAs can receive MBMS data transmitted from the FA including the UE. That is, the area is a single area in view of geographical concept, but the area includes four cells having different frequencies in view of FA supporting the MBMS data.

It is assumed that a plurality of FAs overlap in the aforementioned one area and each of the FAs services the same MBMS data to at least one UE. Herein, a plurality of radio resources are used for the same MBMS data, thereby wasting the radio resources.

Accordingly, when multiple FAs overlap in one area, at least one FA of the FAs is selected and MBMS data can be provided. Further, when the MBMS service is impossible in a specific FA having multiple overlapping FAs using one area, there is a problem in that the UE contained in the FA in which the MBMS service is impossible cannot receive the MBMS service.

Referring to FIG. 4, when only the FA 402 can support the MBMS service and the FAs 401, 403, and 404 do not support the MBMS service, the UEs contained in the FAs 401, 403, and 404 cannot receive the MBMS service. Accordingly, a method is necessary, which enables even a UE contained an FA that does not support the MBMS service to receive the MBMS service.

SUMMARY OF THE INVENTION

Accordingly, the present invention has been designed to solve the above and other problems occurring in the prior art, and it is an object of the present invention to provide a method of efficiently using a radio resource managed by each of multiple FAs, when multiple cells overlap in the same area.

It is another object of the present invention to provide a method enabling a UE contained in a cell that does not support a packet data service to receive the packet data service, when the cell that does not support the packet data service for the same area and a cell supporting the packet data service for the same area overlap in the same area.

It is further another object of the present invention to provide a method by which a UE determines if a cell including the UE is a cell supporting a packet data service.

In order to accomplish the above and other objects, according to one aspect of the present, there is provided a method for receiving a packet data service in a mobile communication system. The method includes the steps of: notifying cell reselection information of a user equipment located in a cell which does not support the packet data service, the cell reselection information being used when the user equipment moves into a cell supporting the packet data service; assigning a radio resource for supporting the packet data service; and receiving packet data through the assigned radio resource according to the notified cell reselection information.

According to another aspect of the present, there is provided a method for enabling a user equipment located in an FA that does not support a multimedia broadcast/multicast service (MBMS) to receive the MBMS service in a mobile communication system. The method includes the steps of: receiving a notification message from a radio network controller; confirming a service ID of the notification message; determining if the notification message is a notification message for the MBMS service requested by the user equipment; confirming information for reselecting an FA supporting the MBMS service from the notification message when the notification message is the notification message for the MBMS service requested by the user equipment as a result of the determination; and receiving the MBMS service through a radio resource assigned to the FA on the basis of the confirmed information.

According to another aspect of the present, there is provided a method for transmitting an MBMS service to a user equipment in a mobile communication system. The method includes the steps of: receiving a session start message from a core network and then determining whether or not an FA including the user equipment supports the MBMS service; transmitting a notification message, which contains cell reselection information used when the user equipment moves into an FA supporting the MBMS service, to the user equipment when the user equipment is located in an FA which does not support the MBMS service; and receiving the MBMS service through a radio resource of the FA supporting the MBMS service by means of the notification message.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configuration incorporated herein will be omitted when it may obscure the subject matter of the present invention.

Figure 5:
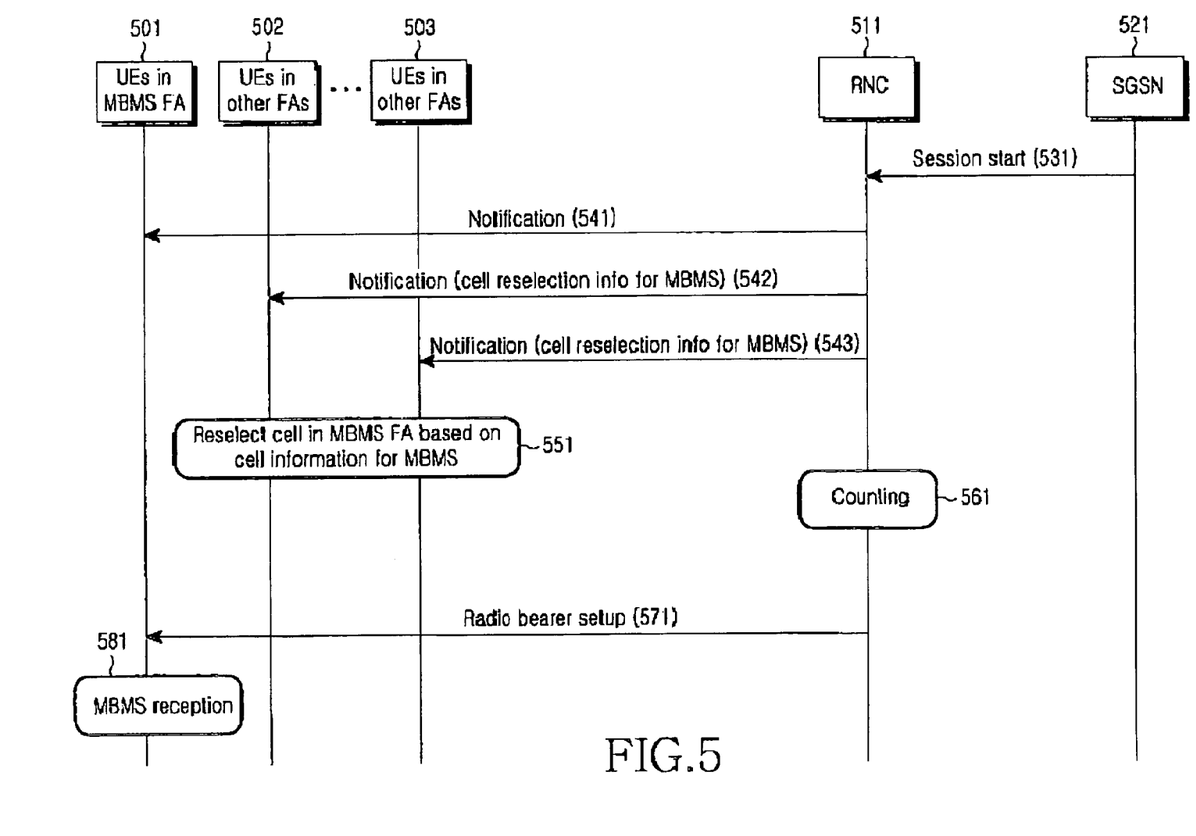
FIG. 5 is a view illustrating an operation between each node in a mobile communication system supporting an MBMS service according to the present invention.

FIG. 5 is a view illustrating a process, through which a MBMS service is supported to a UE included in an FA that does not support the MBMS service, according to an embodiment of the present invention. More specifically, FIG. 5 illustrates an SGSN 521 and an RNC 511 supporting a MBMS service, and a plurality of UEs 501 to 503, which are located in an FA that can support the MBMS service provided from the RNC 511 and an FA that cannot support the MBMS service provided from the RNC 511. Herein, the FA that can support the MBMS service and the FA that cannot support the MBMS service include at least one UE.

Referring to FIG. 5, the FA capable of supporting the MBMS service and the UEs included in the FA are expressed by a reference numeral 501. The FA that cannot support the MBMS service and the UEs included in the FA are expressed by reference numerals 502 and 503.

In the present invention, in order to transmit the MBMS service to corresponding UEs, a service announcement step, a joining step, a notification step, and a radio bearer (RB) setup step are sequentially performed as illustrated in FIG. 3. However, FIG. 5 does not show the service announcement step and the joining step, but it is clear to those who skilled in the art that the service announcement step and the joining step must be performed before the notification step.

After performing the service announcement step and the joining step, the SGSN 521 transmits a session start message to the RNC 511 in step 531. The session start message contains information on a MBMS service ID, a quality of service (QoS) parameter, etc., of a corresponding MBMS service to be immediately provided. The RNC 511 having received the session start message classifies FAs as FAs that can support the MBMS service and FAs that cannot support the MBMS service, and transmits different notification messages to the classified FAs. For example, in step 541, the RNC 511 transmits a notification message to the UEs 501 contained in the FA capable of supporting the MBMS service. The notification message contains the MBMS service ID, a none service area (NSA)/service area (SA) indicator, which indicates whether or not a corresponding FA including the UEs 501 to 503 supports the MBMS service, a resource availability indicator, etc. That is, in step 541, the RNC 511 sets the NSA/SA indicator to be an SA and transmits the notification message.

Herein, the NSA/SA indicator is defined according to each MBMS service. Further, setting a predetermined FA to be an SA indicates that the MBMS service is currently provided or that the FA is an area capable of supporting the MBMS service at some future time. However, setting a predetermined FA to be an NSA indicates that the FA is an area not capable of supporting the MBMS service currently or at some future time.

Further, when a cell currently belongs to an SA for a MBMS service, the resource availability indicator signifies whether or not a resource enabling the MBMS service to be provided exists.

In steps 542 and 543, the RNC 511 transmits a notification message to the UEs 502 and 503 contained in the FA that cannot support the MBMS service. The notification message of steps 542 and 543 further contains cell reselection information for MBMS for receiving the MBMS service, in addition to information contained in the notification message of step 541. That is, the information contained in the notification message of steps 542 and 543 is different from that contained in the notification message of steps 541.

The cell reselection information for MBMS is additional information that enables the UEs 502 and 503 contained in the FA that cannot support the MBMS service to receive the MBMS service. Further, the cell reselection information for MBMS contains frequency information, a cell ID, cell information, etc., of a target cell 501 supporting the MBMS service. The frequency information, the cell ID, and the cell information are variable information and are not contained in the notification message of step 541 as described above.

The frequency information contains an uplink UTRA absolute radio frequency channel number (UARFCN) and a downlink UARFCN.

The cell ID represents an identifier of a cell corresponding to a frequency area supporting the MBMS service.

The cell information represents, for example, a primary scrambling code of a primary common pilot channel (P-CPICH) with respect to an FA supporting the MBMS service.

Additionally, Priorities in transmitting the notification messages in steps 541, 542, and 543 may be changed. That is, step 541 may be performed after steps 542 and 543 are performed.

In step 551, the UEs 502 and 503 contained in the FAs, which cannot or does not support the MBMS service, move into a corresponding cell of the FA capable of supporting the MBMS service by means of the cell reselection information for MBMS transmitted through steps 542 and 543. That is, the UEs 502 and 503 confirm the cell reselection information for MBMS contained in the notification message and reselect the FA 501 supporting the MBMS service. The UEs 502 and 503 perform a process for the cell reselection, thereby receiving the MBMS service, which is transmitted from the RNC 511, by means of a radio resource equal to that used in the UEs 501.

In steps 542 and 543, when the service ID contained in the notification message does not coincide with a service ID of a service in which the UEs 502 and 503 have joined, it is unnecessary to perform step 551.

In step 561, the RNC 511 can calculate the number of UEs, which are intended for reception of the MBMS service, for channel type decision in a cell of the FA 501 supporting the MBMS service, and can determine the kind of radio channels of a corresponding cell. That is, the RNC 511 calculates the number of UEs in the cell, which includes the UEs 502 and 503 having reselected the FA 501 supporting the MBMS service, and determines the kind of radio channels of the cell. When a plurality of UEs in the cell are intended for reception of a MBMS service, the RNC 511 provides the MBMS service through a common channel. However, when the number of UEs intended for reception of the MBMS service is small, the RNC 302 assigns a dedicated channel according to each UE and provides the MBMS service. Counting 561 can be also started after step 531.

In step 571, the RNC 511 transmits the determined radio bearer information through a MCCH to perform the radio bearer setup step. The radio bearer setup step is a step in which the radio channel determined for providing the MBMS service is actually assigned and in which information on the radio channel is announced to relating devices.

In step 581, the UEs in the cell of the FA 501 supporting the MBMS service receive the MBMS service, which is transmitted by the RNC 511, through the MBMS radio channel set in step 571.

As described above, after receiving the session start message, which reports the start of the MBMS service requested by the UEs 501 to 503, from the SGSN 521, the RNC 511 transmits a notification message containing the MBMS service ID and the cell reselection information for MBMS to the UEs 502 and 503 contained in the FAs that cannot or do not support the MBMS service. Accordingly, the UEs 502 and 503 having received the notification message reselect an FA, to which the MBMS service is provided, by means of the information contained in the notification message, and receive the MBMS service.

Figure 6:
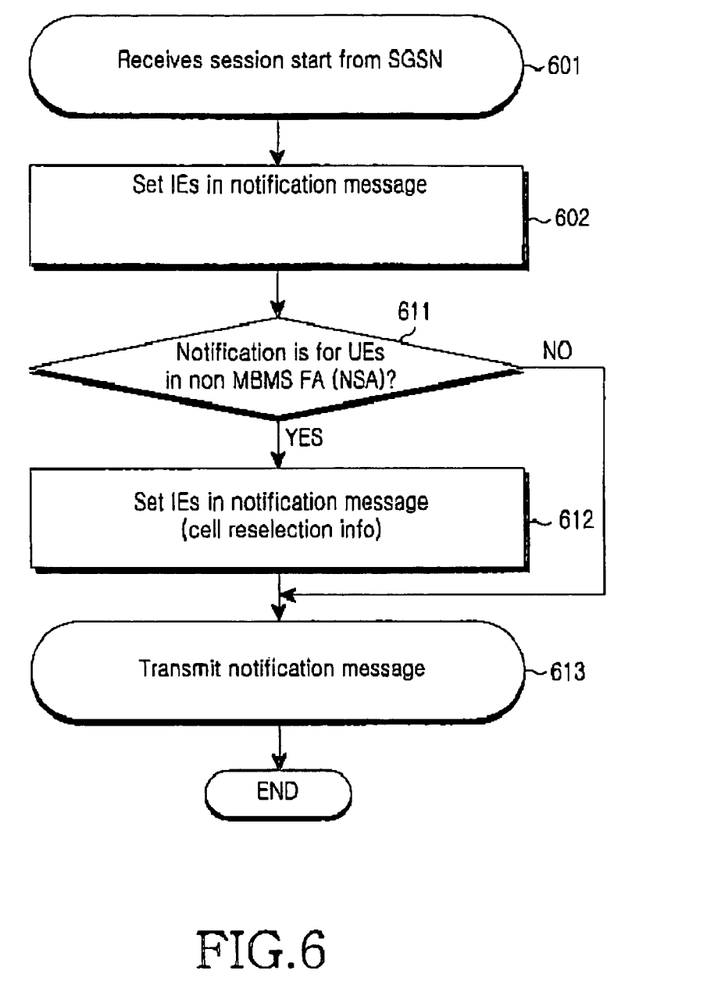
FIG. 6 is a flowchart illustrating an operation of an RNC supporting a MBMS service according to the present invention.

FIG. 6 is a flowchart illustrating an operation of a RNC transmitting a notification message according to an embodiment of the present invention. In step 601, the RNC receives a session message, which is used to report an immediate start of a specific MBMS service requested by predetermined UEs located in a plurality of FAs existing under the control of the RNC, from a SGSN. Herein, the RNC controls an FA supporting the MBMS service and an FA that cannot support the MBMS service. Accordingly, the RNC differently sets notification messages to be transmitted to the FAs in relation to the MBMS service.

In step 602, the RNC sets common information that must be transmitted to UEs contained in the FA supporting the MBMS service and UEs contained in the FA that cannot support the MBMS service, in relation to the MBMS service. The common information includes an MBMS service ID, an NSA/SA indicator, a resource availability indicator, etc.

When the notification message is transmitted to the FA supporting the MBMS service, the NSA/SA indicator is set to be an SA. However, when the notification message is transmitted to the FA that does not support the MBMS service, the NSA/SA indicator is set to be an NSA.

In step 611, the RNC confirms whether the notification message is a messages for the FA supporting the MBMS service or the FA that does not support the MBMS service. Herein, the RNC confirms the NSA/SA indicator of the notification messages.

When the notification message is a notification messages for the FA that does not support the MBMS service, that is, the NSA/SA indicator has been set to be an NSA, step 612 is performed. However, when the notification message is a notification messages for the FA supporting the MBMS service, that is, the NSA/SA indicator has been set to be an SA, step 613 is performed.

In step 612, the RNC adds cell reselection information for MBMS for receiving the MBMS service to the notification messages containing the MBMS service ID set in step 602. That is, the RNC includes frequency information, a cell ID, and cell information of the FA supporting the MBMS service into the notification messages for the FA that does not support the MBMS service.

In step 613, the RNC transmits the notification message set in step 602 or step 612 to a corresponding FA.

In FIG. 6, the RNC firstly sets information that must be commonly transmitted to the FA supporting the MBMS service and the FA that does not support the MBMS service, and then adds the cell reselection information for MBMS with respect to the FA that does not support the MBMS service. That is, the RNC firstly determines whether an FA to which the notification message must be transmitted is the FA supporting the MBMS service or the FA that does not support the MBMS service. Herein, the determination is accomplished according to whether the NSA/SA indicator to be set in the notification message is set or not. When it is assumed that the notification message is set to be an FA supporting the MBMS service, that is, an SA, the RNC sets a notification message containing the information of step 602. However, when it is assumed that the notification message is set to be an FA that does not support the MBMS service, that is, an NSA, the RNC sets a notification message containing all information of steps 602 and 612. Herein, steps 602 and 612 can be performed by one step.

As described above, in the present invention, the RNC can set different information to be contained in the notification message according to characteristics of an FA transmitting the notification message, and transmit the information.

Figure 7:
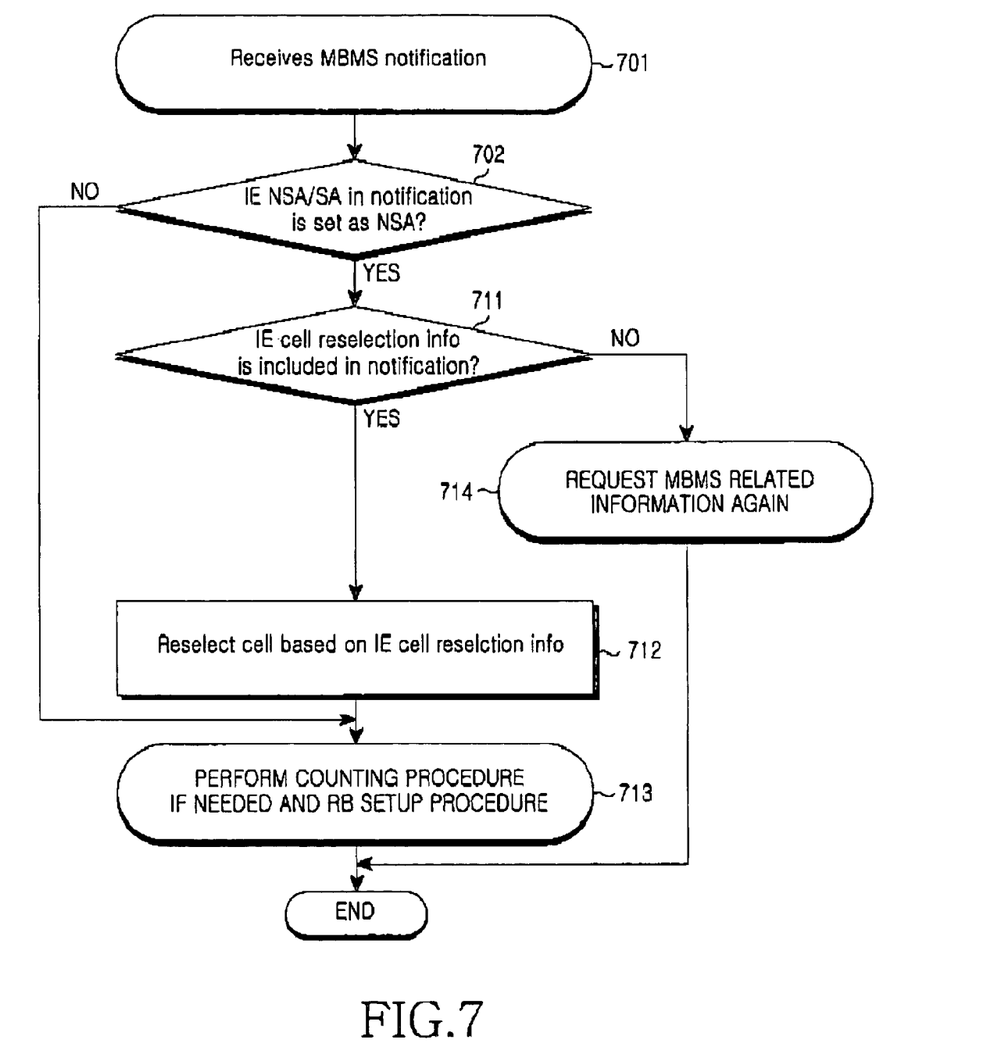
FIG. 7 is a flowchart illustrating an operation of a UE receiving an MBMS service according to the present invention.

FIG. 7 is a flowchart illustrating an operation of a UE according to an embodiment of the present invention. More specifically, FIG. 7 illustrates a process, through which UEs contained in an FA that does not support a MBMS service perform a cell reselection for receiving the MBMS service after receiving transmits the notification message transmitted by the RNC in FIG. 6, according to the present invention.

Referring to FIG. 7, in step 701, a UE receives a notification message, which relates to a MBMS service in which the UE has joined, from a RNC. The UE determines whether or not the MBMS service is a MBMS service requested by the UE by means of a MBMS service ID contained in the notification message. Hereinafter, because only a case in which the MBMS service ID contained in the notification message coincides with an ID of a MBMS service requested by the UE will be described in relation to the present invention, a more detailed description will be omitted.

In step 702, the UE analyzes information set in the notification message. More specially, the UE confirms an NSA/SA indicator of the set information and determines whether an FA including the UE is an FA supporting the MBMS service or an FA that does not support the MBMS service. When the NSA/SA indicator is set to be an SA, that is, the FA including the UE is the FA supporting the MBMS service, step 713 is performed. However, when the NSA/SA indicator is set to be an NSA, that is, the FA including the UE is the FA that does not support the MBMS service, step 711 is performed.

In step 711, the UE determines if cell reselection information for MBMS is contained in the received notification message. The cell reselection information for MBMS contains information used when the UE contained in the FA that does not support the MBMS service moves into the FA supporting the MBMS service for receiving the MBMS service. That is, the UE confirms whether or not the notification message contains frequency information, a cell ID, and cell information of the FA supporting the MBMS service.

When the received notification message contains the cell reselection information for MBMS, step 712 is performed. However, when the received notification message does not contain the cell reselection information for MBMS, step 714 is performed. That is, the UE request MBMS service related information again. The MBMS service related information may include information on a request of cell reselection information for MBMS or an operation reporting that the cell reselection information for MBMS does not exist in the transmitted notification message.

In step 712, the UE obtains information on the FA supporting the MBMS service by means of the cell reselection information for MBMS contained in the notification message. Further, the UE moves into the FA supporting the MBMS service by means of the obtained information. That is, the UE reselects a cell by means of the frequency information, the cell ID, and the cell information of the FA supporting the MBMS service, thereby receiving the MBMS service.

Through the performance of the steps, the UE contained in the FA that does not support the MBMS service can receive the MBMS service transmitted from the RNC. That is, in step 713, the UE transmits a response message for the notification message to the RNC. The UE receives the MBMS service, which is transmitted from the RNC, by means of a radio resource used in the FA supporting the MBMS service.

As described above, in the present invention, when a cell that does not support a packet data service and a cell supporting the packet data service overlap in the same area, radio resource information on the cell supporting the packet data service is notified to a UE contained in the cell that does not support the packet data service. Accordingly, a support is performed for a UE located in a specific area by means of one radio resource, thereby efficiently managing the radio resource for the packet data service.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for receiving a multimedia broadcast/multicast service (MBMS) service by at least one user equipment joining the MBMS service in a communication system, the method comprising:
    receiving, by the user equipment, service information of the MBMS service;
    receiving, by the user equipment, cell reselection information of a cell supporting the MBMS service in a cell not supporting the MBMS service, from a base station;
    performing by the user equipment, MBMS frequency reselection to the cell supporting the MBMS service using the received cell reselection information; and
    receiving by the user equipment, the MBMS service through a radio resource assigned from the base station,
    wherein the cell reselection information includes frequency information for the cell supporting the MBMS service.

2. The method as claimed in claim 1, further comprising:
    sending, by another user equipment that has failed to receive the cell reselection information, a request for retransmission of the cell reselection information to the base station.

3. The method as claimed in claim 1, the MBMS frequency reselection is performed for an uplink and a downlink.

4. The method as claimed in claim 1, wherein the MBMS frequency reselection is performed using at least one of a service identifier (ID) included in the service information of the MBMS service and an identifier for the cell supporting the MBMS service, included in the cell reselection information.

5. The method as claimed in claim 1, wherein the MBMS frequency reselection is performed using scrambling code information of a primary common pilot channel (P-CPICH), which is dedicated information for the cell supporting the MBMS service, included in the cell reselection information.

6. The method as claimed in claim 1, wherein the cell reselection message is received from the base station through a notification message.

7. The method of claim 1, further comprising:
checking, by the user equipment, a MBMS service identifier (ID) included in the service information of the MBMS service, and determining whether the service information of the MBMS service is for an MBMS service requested by the user equipment.

8. The method of claim 1, further comprising:
checking, by the user equipment, an service area/non-service area indicator indicating support/non-support of the MBMS, included in the cell reselection information, and determining whether a cell where the user equipment is located is the cell supporting the MBMS.

9. A method for providing a multimedia broadcast/multicast service (MBMS) service, by a radio network controller in a communication system, the method comprising:
providing service information of the MBMS service;
providing cell reselection information of a cell supporting the MBMS service in a cell not supporting the MBMS service;
assigning a radio resource for the MBMS service to at least one user equipment to which the service information and the cell reselection information are provided; and
providing the MBMS service to the user equipment, to which the radio resource is assigned, through the assigned radio resource,
wherein the cell reselection information includes frequency information for the cell supporting the MBMS service.

10. The method as claimed in claim 9, wherein the cell reselection information is provided to the user equipment through a notification message.

11. The method as claimed in claim 10, wherein the cell reselection information further includes an indicator for indicating whether the cell supporting the MBMS service supports the MBMS.

12. A method as claimed in claim 9, further comprising:
classifying a plurality of cells distinguished by different frequency areas into a cell of a frequency area supporting the MBMS service and a cell of a frequency area not supporting the MBMS service, and sending different notification messages to the classified cells.

13. The method as claimed in claim 12, further comprising
sending a first notification message including an indicator indicating that a corresponding cell is a cell supporting the MBMS service, to at least one user equipment located in the cell supporting the MBMS service; and
sending, to at least one user equipment located in the cell not supporting the MBMS service, a second notification message that further includes frequency information for the cell supporting the MBMS service, an identifier for the cell, and dedicated information for the cell.

14. The method as claimed in claim 13, further comprising:
assigning a radio resource for the MBMS service taking into account a number of user equipments in the cell supporting the MBMS service.

15. The method of claim 9, wherein the cell reselection information includes frequency channel information for an uplink and a downlink.

16. The method of claim 9, wherein the cell reselection information includes an identifier for the cell supporting the MBMS service.

17. The method of claim 9, wherein the cell reselection information is dedicated information for the cell supporting the MBMS service, and includes scrambling code information of a primary common pilot channel (P-CPICH).

18. The method of claim 9, further comprising:
receiving a session message indicating a start of the MBMS service from a core network; and
providing information on the cell supporting the MBMS service to the at least one user equipment.

* * * * *